United States Patent [19]

Wharton

[11] Patent Number: 4,761,587

[45] Date of Patent: Aug. 2, 1988

[54] MULTIPLE FREQUENCY HORIZONTAL OSCILLATOR FOR VIDEO APPARATUS

[75] Inventor: James H. Wharton, Indianapolis, Ind.

[73] Assignee: RCA Licensing Corporation, Princeton, N.J.

[21] Appl. No.: 942,894

[22] Filed: Dec. 17, 1986

[51] Int. Cl.$^4$ .................. H01J 29/70; H03L 7/00
[52] U.S. Cl. .................. 315/408; 358/159; 358/195.1; 331/20
[58] Field of Search ............ 358/158, 159, 137, 195.1; 331/20; 315/408

[56] References Cited

U.S. PATENT DOCUMENTS

| | | | |
|---|---|---|---|
| 3,127,570 | 3/1964 | Smeulers | 358/159 |
| 3,593,179 | 7/1971 | Hovens | 358/159 |
| 3,641,258 | 2/1972 | Steckler | 358/159 |
| 3,946,329 | 3/1976 | Caspari | 331/20 |
| 4,253,116 | 2/1981 | Rodgers, III | 358/158 |
| 4,374,437 | 2/1983 | Citta et al. | 358/195.1 |
| 4,417,279 | 11/1983 | Shinkawa et al. | 358/195.1 |
| 4,439,787 | 3/1984 | Mogi et al. | 358/195.1 |
| 4,443,769 | 4/1984 | Aschwanden et al. | 331/20 |
| 4,461,999 | 7/1984 | Wolf et al. | 331/20 |
| 4,567,447 | 1/1986 | Srivastava et al. | 331/20 |
| 4,574,224 | 3/1986 | Nowaczyk | 315/408 |
| 4,598,236 | 7/1986 | Hepworth | 358/137 |
| 4,612,574 | 9/1986 | Barnes | 331/20 |
| 4,634,939 | 1/1987 | Dietz | 315/399 |
| 4,645,989 | 2/1987 | Barnes | 315/408 |
| 4,679,091 | 7/1987 | Kikuchi et al. | 358/158 |

*Primary Examiner*—Theodore M. Blum
*Assistant Examiner*—David Cain
*Attorney, Agent, or Firm*—Eugene M. Whitacre; Joseph J. Laks; Sammy S. Henig

[57] ABSTRACT

A deflection circuit for a video apparatus is capable of operating at different horizontal rate frequencies in response to the incoming video information rate. In one embodiment, the deflection oscillator input voltage is varied in a cyclical manner to vary the oscillator frequency. When the oscillator frequency corresponds to the frequency of the incoming video information, the input voltage is maintained to maintain the desired oscillator frequency. In an alternate embodiment, a frequency to voltage converter generates the desired oscillator input voltage in response to the incoming video information rate.

7 Claims, 2 Drawing Sheets

MULTIPLE FREQUENCY HORIZONTAL OSCILLATOR FOR VIDEO APPARATUS

This invention relates to video apparatus and, in particular, to video apparatus that operate at a number of different line rate frequencies.

A video apparatus, such as a television receiver or a computer monitor, for example, receives video information at a particular rate or frequency. The deflection or scanning circuits of the video apparatus are synchronized to the frequency of the video information in order to display the video information on a cathode ray tube. In the case of a conventional television receiver, for example, the video information occurs at fixed, predetermined rates and methods of synchronization of the deflection systems are well known and relatively straightforward. A computer monitor, however, may be designed to be compatible with a variety of different computers of different manufacturers, which may produce video signals at different information rates. The range of possible operating frequencies may also be quite large, further complicating the deflection system design. It is possible to design a horizontal or line rate deflection oscillator that will become synchronized with incoming video information occurring at a finite number of known signal rates using frequency switching and automatic frequency control (AFC) circuitry. It is desirable, in order to have expanded compatibility, to provide automatic synchronization of the deflection circuitry to any incoming video information frequency over a wide range of possible frequency values.

In accordance with an aspect of the present invention, a video apparatus incorporates a deflection circuit capable of operating at a frequency determined by an incoming information rate signal. The deflection circuit includes an oscillator that produces an output signal having a frequency determined by the level of an input signal. A circuit periodically varies the level of the oscillator input signal to cause the oscillator to vary its output signal frequency. Circuitry produces an output signal when the oscillator output signal frequency and the frequency of the incoming video information rate signal correspond. Circuitry responds to that output signal and maintains the oscillator output signal at the frequency of the incoming video information rate signal.

In the accompanying drawing.

Figure 1:
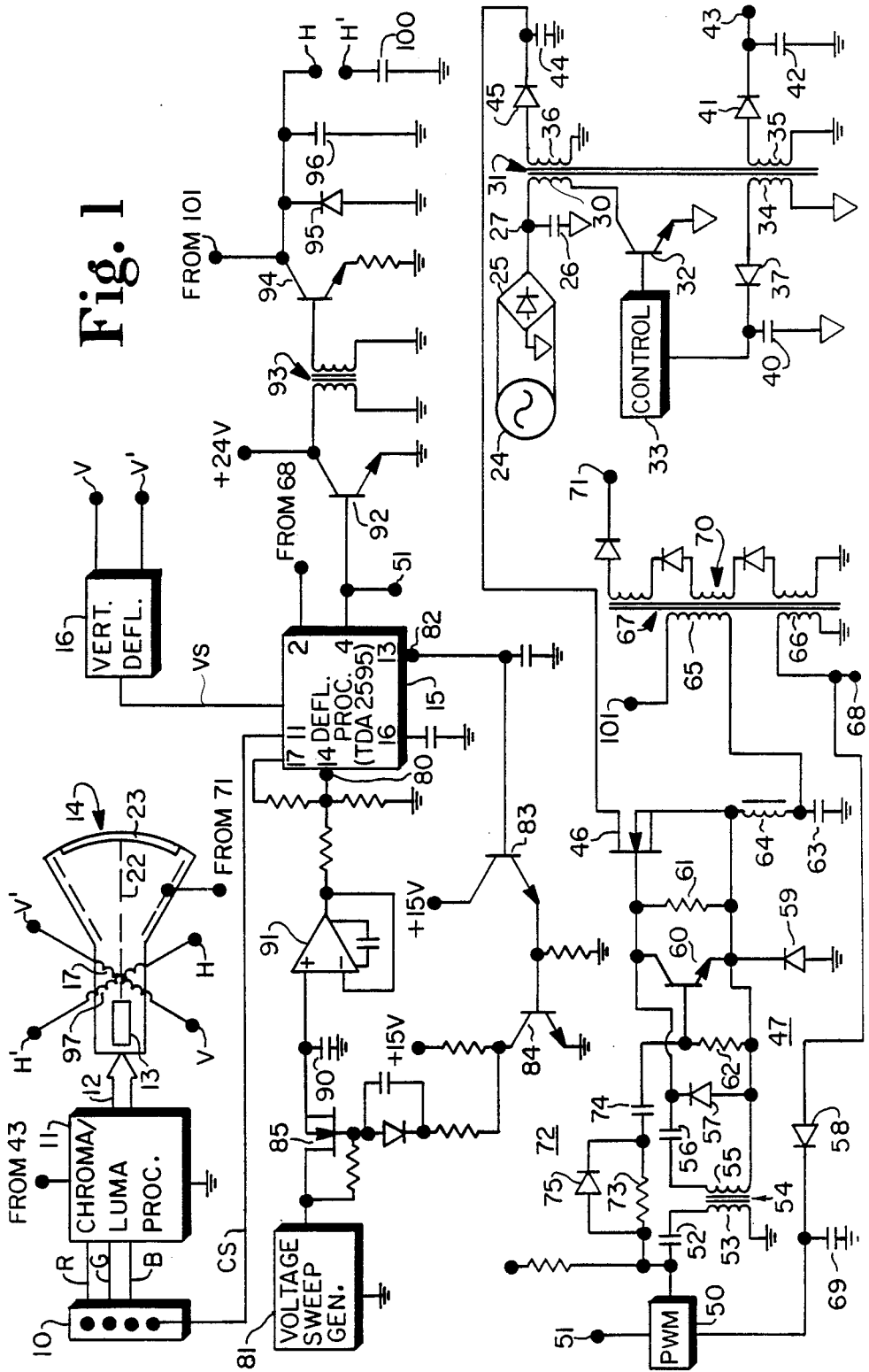
FIG. 1 is a block and schematic diagram of a portion of a video apparatus in accordance with an aspect of the present invention.

Referring to FIG. 1, there is shown a portion of a video apparatus, illustrated as a color computer monitor, in which a video signal in the form of red, green and blue color video components are applied to the video display apparatus from an external source (not shown), such as a computer, via an input terminal strip 10. The color video components, designated R, G, and B are applied to chrominance and luminance processing circuitry 11 which generates red, green and blue color drive signals. The color drive signals are applied via a conductor 12 to the electron gun assembly 13 located within the neck of a cathode ray tube (CRT) 14.

Also applied to the video display apparatus via terminal strip 10 is a composite synchronizing (sync) signal, designated CS, that illustratively incorporates both line and field rate synchronizing information. The sync signal is applied to deflection processing circuitry 15, where it is separated into the respective line and field rate sync information components or pulses. Deflection processing circuitry 15 is illustratively shown as an integrated circuit designated TDA 2595, manufactured by Signetics Corporation. Device terminal numbers are also illustrated within the outline of deflection processing circuitry 15. The field rate, or vertical, sync pulses are applied via a conductor designated VS to vertical deflection circuitry 16 which produces vertical or field rate deflection current via terminal V and V' in vertical deflection winding 17, located on CRT 14. The deflection current flowing in deflection winding 17 creates an electromagnetic deflection field that provides vertical deflection of the electron beams 22 generated by electron gun assembly 13 in a predetermined pattern across phosphor display screen 23 located on the front panel of CRT 14.

It is desirable to configure the deflection circuitry of a video apparatus operating as a computer monitor to be able to operate at different deflection or scan frequencies, in order to be compatible with different computers having various operating frequencies, or with computers having two or more selectable frequencies that may be used to improve the resolution of the video display. Proper operation of the deflection circuits may require adjustment of the operating supply voltages at different deflection or operating frequencies. This is illustratively accomplished in the following manner.

A source of power, such as AC line supply 24, is connected to a rectifying circuit 25 and a filter capacitor 26 to provide a source of unregulated DC voltage at a terminal 27. The unregulated DC voltage is applied to one terminal of a winding 30 of a power transformer 31. The other terminal of winding 30 is connected to the collector of a switching transistor 32. Conduction of transistor 32, determined by control circuit 33, causes current to flow in winding 30 which, by transformer action, causes current to flow in windings 34, 35 and 36. The current in winding 34 is rectified by diode 37 and charges capacitor 40 to develop a feedback voltage that is applied to control circuit 33. In response to the feedback voltage, control circuit 33 controls the conduction interval of transistor 32 in order to maintain the voltage across capacitor 40 at a constant regulated level. Regulation of the voltage across capacitor 40 results in regulation of the load supplies derived from transformer windings 35 and 36. Transformer 31 also provides electrical isolation between the "hot" AC line and the "cold" load circuits and user interface connectors, such as input terminal strip 10. Winding 35 current, rectified by diode 41, charges capacitor 42 to provide a voltage at a terminal 43 that is used to power various circuits of the video display apparatus, such as chrominance and luminance processing circuit 11, for example. The voltage established across capacitor 44, derived from winding 36 via diode 45, is applied to the drain terminal of a field effect transistor (FET) 46, which forms part of a frequency dependent power supply circuit 47 that operates as follows.

Power supply circuit 47, operating as a DC to DC converter, incorporates pulse width modulating circuit 50, which receives an input signal at a terminal 51 from deflection processing circuitry 15. This input signal comprises pulses occurring at the horizontal deflection or line rate, which are derived in accordance with an aspect of the present invention in a manner that will be described later. Pulse width modulator circuit 50, illustratively comprises an integrated circuit designated NE5560, manufactured by Signetics Corporation. Pulse width modulator circuit 50 produces an output signal incorporating width-modulated pulses having a frequency determined in response to the input pulse frequency. The output signal of pulse width modulator circuit 50 is applied via coupling capacitor 52 to primary winding 53 of a transformer 54. Secondary winding 55 of transformer 54 has one terminal coupled via capacitor 56 to the cathode of a diode 57, the collector of a transistor 60, one terminal of a resistor 61 and the gate of FET 46. The other terminal of secondary winding 55 is coupled to the anode of diode 57, a transistor bias resistor 62, the emitter of transistor 60, the cathode of a flywheel diode 59, the other terminal of resistor 61 and the source terminal of FET 46. The source terminal of FET 46 is also coupled to a supply capacitor 63 via an inductor 64. Transformer 54 provides DC isolation that allows the secondary circuits to be referenced to the voltage across capacitor 63.

The deflection rate or frequency-representative pulses produced by pulse width modulator circuit 50 applied to primary winding 53 cause switching of FET 46 by transformer action. Conduction of FET 46 charges capacitor 63 via FET 46 and inductor 64 from the supply voltage developed across capacitor 44. Since the duty cycle of FET 46 is determined by the horizontal deflection frequency, the voltage developed across capacitor 63 will also be dependent upon the horizontal deflection rate or frequency and may therefore be utilized as a supply voltage for circuits that require different operating voltage levels in response to different deflection frequencies. The voltage across capacitor 63 is applied to a winding 65, which forms the primary winding of a conventional flyback-type high voltage transformer 67. The voltage developed across tertiary winding 70 forms a high voltage or ultor potential at a terminal 71 that is applied to CRT 14. The voltage developed across secondary winding 66 is applied to deflection processing circuitry 15 via a terminal 68. This voltage also develops a DC voltage level via diode 58 and a capacitor 69 that provides power to pulse width modulator circuit 50.

In order to avoid dissipating a significant amount of power in FET 46, and hence prevent its overheating, it is important that FET 46 be switched between its conduction states as quickly as possible. Pulses from pulse width modulator circuit 50 are coupled from the primary winding of transformer 54 to the base of transistor 60 via differentiating network 72 comprising resistor 73, capacitor 74, and diode 75. The leading edge of the turn-off pulse for FET 46 is differentiated by differentiating network 72 to form a positive going pulse signal which is applied to the base of transistor 60. The differentiated pulse from the trailing edge of the modulator 50 pulses is reduced in amplitude by diode 75. The differentiated positive-going pulses quickly turn on transistor 60 which in turn rapidly turn off FET 46.

As previously described, it is desirable that a video apparatus, particularly a video apparatus used as a computer monitor, be capable of operating at different video information rate frequencies in order to enhance the compatibility of the video apparatus when used with different computers. In accordance with a novel aspect of the present invention, the video apparatus shown in FIG. 1 will synchronize its operating frequency to that of any video information rate signal having a frequency occurring between predetermined upper and lower frequency limits, illustratively 15 KHz and 30 KHz, for example. Deflection processing circuitry 15 produces output signal pulses at terminal 51, for example, having a pulse frequency determined by the level of the voltage applied to a terminal 80. Synchronization of the frequency of the output pulse signal at terminal 51 with the frequency of the incoming video information as represented by the horizontal deflection or line rate synchronizing signal component on conductor CS is provided as follows. Voltage sweep generator 81, which may be of conventional design, produces a triangular output waveform that varies between a lower voltage level illustratively of the order of 1 volt and an upper voltage level illustratively of the order of 15 volts. The upper and lower voltage limits are selected so that the voltage levels that are applied to terminal 80 of deflection processing circuitry 15 result in a frequency range that encompasses the desired line rate or frequency operating range of the video apparatus.

As the output signal voltage of voltage sweep generator 81 is cyclically swept or varied through its voltage range, the horizontal or line rate oscillator of deflection processing circuitry 15 will in turn cyclically vary its operating frequency. During the time that the oscillator frequency does not correspond to the frequency of the incoming video information, as represented by the horizontal sync signal component appearing on conductor CS, the coincidence detector output of deflection processing circuitry 15 at terminal 82 will be a defined low level signal. This low level output, applied to the base of a transistor 83, will cause transistor 83 to be rendered nonconductive, which in turn maintains transistor 84 nonconductive. With transistor 84 nonconductive, the voltage at the collector of transistor 84 is high so that field effect transistor (FET) 85 is rendered conductive. Conduction of FET 85 allows the output voltage of voltage sweep generator 81 to charge capacitor 90, so that the voltage across capacitor 90 will follow the output voltage of voltage sweep generator 81. Amplifier 91, configured as a sample and hold circuit, acts to apply the voltage across capacitor 90 to input terminal 80 of deflection processing circuitry 15.

As the frequency of the oscillator of deflection processing circuitry 15 is varied in response to the varying output voltage of voltage sweep generator 81, the oscillator frequency will at some time correspond to that of the incoming horizontal rate sync signal. When this occurs, the coincidence detector output at terminal 82 will become a high level signal, thereby rendering transistor 83 conductive, which in turn causes transistor 84 to become conductive. The collector voltage of transistor 84 will fall to a level sufficient to render FET 85 nonconductive. The voltage across capacitor 90 will then no longer follow the varying output voltage of voltage sweep generator 81, but will instead be maintained at the voltage level required to provide an oscillator frequency corresponding to the incoming video information rate frequency. The input impedance of amplifier 91 is very high so that the voltage level across capacitor 90 is maintained. Each time the incoming video information rate is changed, the oscillator of the deflection processing circuitry 15 is varied in a predetermined manner until coincidence with the incoming video information frequency is again established. The rate at which the output signal of voltage sweep generator 81 is varied between the frequency limits, illustratively of the order of 1 second, is selected to insure that any load circuit supply voltages that are required to be changed in response to the change in operating frequency have sufficient time to reach their desired voltage levels before the oscillator frequency is changed.

The output pulses of deflection processing circuitry 15, which appear at terminal 51, are also applied to the base of a line rate driver transistor 92 and cause transistor 92 to switch conductive states at the line rate frequency. These switching pulses are transmitted via a driver transformer 93 to the base of a horizontal output transistor 94, which forms part of a resonant retrace type of deflection output circuit. The output circuit illustratively includes a damper diode 95, a retrace capacitor 96, a deflection winding 97, located on the neck of CRT 14 and connected via terminals H and H' and an S-shaping capacitor 100. The deflection output circuit causes a horizontal or line rate deflection current to flow in deflection winding 97, which creates an electromagnetic deflection field that deflects or scans electron beam 22 across display screen 23 of CRT 14. Power is supplied to the output circuit via terminal 101 of winding 65. Retrace or flyback pulses produced by the switching of transistor 94 that appear across winding 65 result in the previously described voltages being developed across windings 66 and 70.

Figure 2:
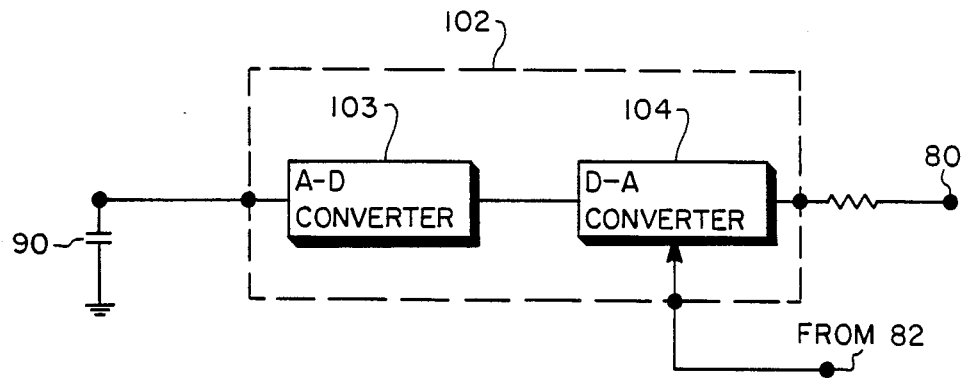
FIG. 2 is a schematic diagram of an alternate embodiment of a portion of the circuit shown in FIG. 1.

The sample and hold circuit comprising amplifier 91 is shown as illustratively operating in an analog manner. FIG. 2 illustrates the use of digital sampling components as an alternate embodiment. FIG. 2 shows a digital sample and hold circuit 102 comprising an analog-to-digital converter 103, which samples the voltage across capacitor 90 and generates a corresponding digital value. A digital-to-analog converter 104 transforms the digital value back into an analog value for application to deflection processing circuitry 15. A signal, illustratively provided from coincidence signal output terminal 82 is applied to digital-to-analog converter 104 in order to maintain the digital value which corresponds to the desired oscillator input voltage. The advantage of digital circuit 102 is that the storage of a digital value provides a more stable and accurate representation of the desired oscillator input voltage than is possible using analog techniques.

Figure 3:
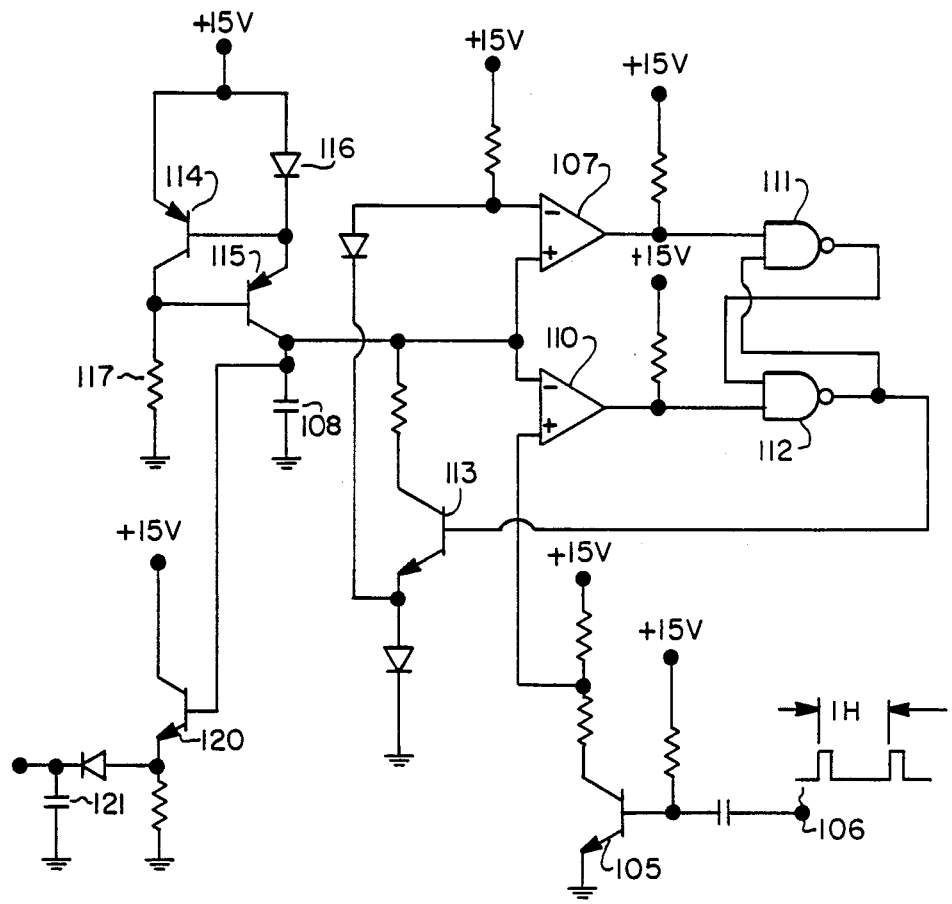
FIG. 3 is a schematic diagram of an alternate embodiment of another portion of the circuit shown in FIG. 1.

FIG. 3 illustrates an illustrative embodiment of a frequency to voltage converter that directly generates the desired oscillator input voltage in response to incoming video information frequency, thereby eliminating the need for a cyclically varying voltage signal. The frequency to voltage converter operates as follows. Positive going line rate synchronizing pulses, indicative of the incoming video information rate, are provided by deflection processing circuitry 15 and applied to the base of transistor 105 via terminal 106. Immediately following the occurrence of a synchronizing pulse, transistor 105 is nonconductive, with its collector voltage at a defined high level. Capacitor 108 has discharged to a level such that the output level of comparator 107 is low and comparator 110 is high. Logic NAND gates 111 and 112 are configured such that the output of NAND gate 112 is low, thereby rendering transistor 113 nonconductive. Capacitor 108 begins to charge via a ramp generator essentially formed by transistors 114 and 115, diode 116, resistor 117 and capacitor 108. As capacitor 108 becomes charged, transistor 120 becomes conductive, thereby charging capacitor 121. Capacitor 108 continues to charge until the occurrence of a line rate synchronizing pulse renders transistor 105 conductive, bringing its collector voltage low, causing the output of comparator 110 to go low. The output of NAND gate 112 becomes high, rendering transistor 113 conductive and discharging capacitor 108. At the termination of the sync pulse, the cycle repeats. Over a number of line or horizontal intervals, capacitor 121 becomes charged to a level representative of the frequency of the incoming sync pulses. The voltage across capacitor 121 may therefore be used to control the oscillator of deflection processing circuitry 15 in order to provide the desired oscillator frequency. If the incoming video information rate frequency should change, the charging interval of capacitor 108 will change, with the result that the conduction interval or duty cycle of transistor 120 also changes. Capacitor 121 therefore charges to a different voltage level indicative of the changed frequency.

In order to insure that proper synchronization of the oscillator occurs, it may be desirable to add a small low frequency dither signal to the output signal of the frequency to voltage converter. This insures that proper coincidence between the incoming video information and the oscillator frequency is achieved by varying the oscillator input voltage slightly.

What is claimed is:

1. In a video apparatus, a deflection circuit capable of operating at a frequency determined by an incoming video information rate signal, said frequency being between first and second frequencies, said deflection circuit comprising:

oscillator means for producing an output signal having a frequency determined in response to an input signal level;

first means for periodically varying said input signal level to said oscillator for causing said oscillator to periodically vary the frequency of said output signal between first and second frequencies, said second frequency being significantly greater than said first frequency;

second means responsive to said oscillator output signal and to said incoming video information rate signal for producing an output signal when said frequency of said video information rate signal equals said frequency of said oscillator output signal during said periodic varying of said oscillator output signal frequency;

third means responsive to said output signal of said second means for maintaining said oscillator output signal frequency at said frequency of said incoming video information rate signal.

2. The arrangement defined in claim 1, wherein said first means comprises a voltage sweep generator.

3. The arrangement defined in claim 1, wherein said second means comprises a frequency coincidence detector.

4. The arrangement defined in claim 1, wherein said third means comprises a sample and hold circuit.

5. The arrangement defined in claim 4 wherein said sample and hold circuit comprises an analog to digital converter, a digital to analog converter and means responsive to said output signal of said second means for maintaining a constant level output signal from said digital to analog converter.

6. In a video apparatus, a deflection circuit capable of operating at a frequency determined by an incoming information rate signal, said deflection circuit comprising:
  oscillator means for producing an output signal having a frequency determined in response to an input signal level;
  first means for providing an input signal level to said oscillator in response to the frequency of said incoming video information rate signal, said first means responsive to said frequency when said frequency is between first and second frequencies, said second frequency being of the order of twice said first frequency;
  second means responsive to said oscillator output signal and to said incoming video information rate signal for producing an output signal when said frequency of said video information rate signal corresponds to said frequency of said oscillator output signal;
  third means responsive to said output signal of said second means for maintaining said oscillator output signal frequency at said frequency of said incoming video information rate signal.

7. The arrangement defined in claim 6, wherein said first means comprises a frequency to voltage convertor.

* * * * *